(12) United States Patent
Vaze et al.

(10) Patent No.: US 10,977,589 B2
(45) Date of Patent: Apr. 13, 2021

(54) TASK ASSIGNMENT METHOD, COMPUTER PROGRAM PRODUCT AND TASK ASSIGNMENT SYSTEM

(71) Applicant: KONINKLIJKE PHILIPS N.V., Eindhoven (NL)

(72) Inventors: Vikrant Suhas Vaze, White Plains, NY (US); Hanqing Cao, Mahwah, NJ (US); Saeed Reza Bagheri, New York, NY (US); Choo Chiap Chiau, Shanghai (CN); Renjun Yu, Shanghai (CN); Yugang Jia, Shanghai (CN); Mina Deng, Shanghai (CN); Michael Martin Scheja, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1180 days.

(21) Appl. No.: 15/030,410

(22) PCT Filed: Oct. 24, 2014

(86) PCT No.: PCT/EP2014/072812
§ 371 (c)(1),
(2) Date: Apr. 19, 2016

(87) PCT Pub. No.: WO2015/059259
PCT Pub. Date: Apr. 30, 2015

(65) Prior Publication Data
US 2016/0247105 A1  Aug. 25, 2016

(30) Foreign Application Priority Data

Oct. 25, 2013 (WO) ................ PCT/CN2013/001285
Nov. 22, 2013 (EP) ..................................... 13194087

(51) Int. Cl.
*G06Q 10/00* (2012.01)
*G06Q 10/06* (2012.01)
(Continued)

(52) U.S. Cl.
CPC .. *G06Q 10/06311* (2013.01); *H04M 15/8033* (2013.01); *H04W 4/023* (2013.01); *H04W 4/029* (2018.02)

(58) Field of Classification Search
None
See application file for complete search history.

(56) References Cited

U.S. PATENT DOCUMENTS 6,998,978 B2   2/2006   Kirke
7,363,319 B2 *  4/2008   Cappellini ............. G06Q 10/08
(Continued)

FOREIGN PATENT DOCUMENTS

CN   101383089 A   3/2009
CN   102306455 A   1/2012
(Continued)

OTHER PUBLICATIONS

Zhang, Dongsong. "Delivery of personalized and adaptive content to mobile devices: a framework and enabling technology." Communications of the Association for Information Systems 12.1 (2003): 13. (Year: 2003).*

(Continued)

*Primary Examiner* — Gurkanwaljit Singh (57) ABSTRACT

Disclosed is a computer-implemented method (1) of assigning a task to a mobile communication device (212, 222) belonging to a pool (210, 220) of mobile communication devices, wherein each mobile communications device is associated with a trusted owner and is locatable by means of location information, the method comprising generating (10) a task to be performed; generating a set of task locations at
(Continued)

which the task can be performed; receiving (20) location information for said mobile communications devices; deriving (30) a location for each mobile communications device from said location information; using the derived location to calculate (40) a cost score for each mobile communication device, said cost score indicating the cost of the trusted owner of said mobile communication device to reach a target location; and assigning (60) the task to a selected location in said set and to one of said mobile communications devices, wherein the task is assigned to the one of said mobile communications devices based on the calculated cost scores. A computer program product including program code for executing this method on a computer processor and a system adapted to execute this method are also disclosed.

11 Claims, 5 Drawing Sheets

(51) Int. Cl.
  *H04W 4/029* (2018.01)
  *H04M 15/00* (2006.01)
  *H04W 4/02* (2018.01)

(56) References Cited

U.S. PATENT DOCUMENTS

| | | | |
|---|---|---|---|
| 8,060,394 B2* | 11/2011 | Woodings | G06F 16/258 |
| | | | 705/7.13 |
| 8,249,547 B1 | 8/2012 | Fellner | |
| 9,182,764 B1* | 11/2015 | Kolhouse | G01C 21/3469 |
| 9,958,272 B2* | 5/2018 | Morris, IV | G01C 21/3415 |
| 10,197,410 B2* | 2/2019 | Guo | G01C 21/3438 |
| 2003/0014286 A1* | 1/2003 | Cappellini | G06Q 10/025 |
| | | | 705/5 |
| 2004/0267595 A1* | 12/2004 | Woodings | G06Q 10/06311 |
| | | | 705/7.14 |
| 2005/0043037 A1 | 2/2005 | Ioppe | |
| 2006/0058948 A1 | 3/2006 | Blass | |
| 2006/0061488 A1 | 3/2006 | Dunton | |
| 2006/0265103 A1 | 11/2006 | Orita | |
| 2008/0243666 A1* | 10/2008 | Rowan | G06Q 30/08 |
| | | | 705/37 |
| 2010/0004005 A1 | 1/2010 | Pereira | |
| 2010/0179853 A1* | 7/2010 | Garcia | G06Q 10/0631 |
| | | | 705/7.12 |
| 2011/0045841 A1 | 2/2011 | Kuhkle | |
| 2011/0153192 A1 | 6/2011 | Lin | |
| 2013/0253969 A1* | 9/2013 | Das | G06Q 10/06 |
| | | | 705/7.13 |
| 2014/0046585 A1* | 2/2014 | Morris, IV | G01C 21/3415 |
| | | | 701/468 |
| 2014/0058801 A1* | 2/2014 | Deodhar | G06Q 10/0639 |
| | | | 705/7.38 |
| 2016/0138928 A1* | 5/2016 | Guo | G06F 16/29 |
| | | | 701/537 |

FOREIGN PATENT DOCUMENTS

| | | |
|---|---|---|
| CN | 102750600 A | 10/2012 |
| CN | 103198653 A | 7/2013 |
| CN | 103218769 A | 7/2013 |
| CN | 103312782 A | 9/2013 |
| JP | 2002183380 A | 6/2002 |
| JP | 2003085287 A | 3/2003 |

OTHER PUBLICATIONS

Liang, Ting-Peng, and Chih-Ping Wei. "Introduction to the Special Issue: Mobile Commerce Applications." International Journal of Electronic Commerce 8.3 (2004): 7-17. (Year: 2004).*

Alt, Florian, et al. "Location-based crowdsourcing: extending crowdsourcing to the real world." Proceedings of the 6th Nordic Conference on Human-Computer Interaction: Extending Boundaries. 2010. (Year: 2010).*

Lv, et al., "iCare: A Mobile Health Monitoring System for the Elderly" Green Computing and Communications, 2010 IEEE/ACM, International Conference on Cyber, Physical and Social Computing, pp. 699-705 (E-ISBN 978-0-7695-4331-4).

Chiu D K W et al: "Alerts for healthcare process and data integration", System Sciences, 2004. Proceedings of the 37th Annual Hawaii International Conference on Jan. 5-8, 2004, Piscataway, NJ, USA, IEEE, Jan. 5, 2004.

Treu, et al., "Efficient Proximity Detection for Location Based Services", 2005, Proceedings of the 2nd Workshop on Positioning, Navigation and Communication (WPNC'05) & 1st Ultra-Wideband Expert Talk (UET'05).

* cited by examiner

TASK ASSIGNMENT METHOD, COMPUTER PROGRAM PRODUCT AND TASK ASSIGNMENT SYSTEM

CROSS REFERENCE TO RELATED APPLICATIONS

This application is the U.S. National Phase application under 35 U.S.C. § 371 of International Application No. PCT/EP2014/072812, filed Oct. 24, 2014, published as WO 2015/059259 on Apr. 30, 2015, which claims the benefit of European Patent Application Number 13194087.6 filed Nov. 22, 2013 and International Application No. PCT/CN2013/001285, filed Oct. 25, 2013. These applications are hereby incorporated by reference herein.

FIELD OF THE INVENTION

The present invention relates to a computer-implemented method of assigning a task to a mobile communication device belonging to a pool of mobile communications devices, wherein each mobile communications device is associated with a trusted owner and is locatable by means of location information.

The present invention further relates to a computer program product comprising computer program code for executing such a method on a computer.

The present invention yet further relates to a system adapted to implement such a method.

BACKGROUND OF THE INVENTION

In modern society, electronic communication media such as the Internet and mobile phones are becoming more and more commonplace in helping to deliver services to their users. As such, these media can be used as powerful tools to increase quality of life.

This is for instance of particular relevance where these media can be used to safeguard the well-being of its users, for instance in the case of frail and elderly people having restricted mobility due to their age and/or physical condition. Such elderly people typically require the help of others to be able to cope with everyday life, especially when still living independently. It is well-documented that it is important that elderly people can live independently for as long as possible. This usually is better for their mental well-being and reduces the burden on the health care system because around the clock care does not have to be provided. The latter is of course of particular importance as improved living standards and healthcare means that the world is facing an ageing population.

Elderly people may require assistance for a range of tasks. For instance, there may be a medical emergency, in which case the elderly person may require a medical professional to visit them, or the elderly person may require a non-urgent task to be performed, e.g. the collection of medication from a remote dispensary, a list of shopping to be done, repairs to their house to be performed and so on.

A number of solutions exist that can be used by elderly people to get support for such tasks. For instance, Z. Lv et al. in Green Computing and Communications, 2010 IEEE/ACM, International Conference on Cyber, Physical and Social Computing, pages 699-705 (E-ISBN 978-0-7695-4331-4) describe a mobile health monitoring system called iCare for the elderly. The system uses wireless body sensors and smart phones to monitor the well-being of the elderly. When detecting an emergency, the smart phone will automatically alert pre-assigned people and call the ambulance of the emergency centre.

US 2011/045841 A1 discloses an alert system that determines a physical location associated with a task in a task list; compare the physical location of the contact with the physical location associated with the task; determine when the physical location of the contact matches the physical location associated with the task; and transmit an alert message indicating the contact and the task. However, a drawback of this system is that it is by no means guaranteed that the contact in the closest vicinity to the task location at the time of determining the location of that contact is the most appropriate contact for handling the task. This therefore can lead to tasks being completed with unacceptable delays or not completed at all. Therefore, there exists a need to schedule such tasks in a more intelligent manner.

SUMMARY OF THE INVENTION

The present invention seeks to provide a computer-implemented method of assigning a task to a mobile communication device in a more intelligent manner.

The present invention further seeks to provide a computer program product comprising computer program code for executing such a method on the one or more processors of a computer system.

The present invention yet further seeks to provide a system adapted to execute such a computer program product.

According to an aspect, there is provided a computer-implemented method of assigning a task to a mobile communication device belonging to a pool of mobile communication devices, wherein each mobile communications device is associated with a trusted owner and is locatable by means of location information, the method comprising generating a task to be performed; generating a set of task locations at which the task can be performed; receiving location information for said mobile communications devices; deriving a location for each mobile communication device from said location information; using the derived location to calculate a cost score for each mobile communication device, said cost score indicating the cost of the trusted owner of said mobile communication device to reach a target location; and assigning the task to a selected location in said set and to one of said mobile communication devices, wherein the task is assigned to the one of said mobile communication devices based on the calculated cost scores.

The present invention provides a task assignment method in which a location determined for a trusted owner of a mobile communication device is used as a parameter in a cost function to determine the cost (e.g. effort) required by that owner to complete the task if assigned to him or her.

For instance, in an embodiment the step of calculating said cost score comprises retrieving information regarding the travel conditions between the derived location and the task location and including said information in said calculation. This therefore gives a more accurate reflection of the time and effort required to complete a task from a given location, which level of accuracy cannot be achieved if only distance between the current location of a trusted user and the physical location of a task is considered.

In an alternative embodiment, the task to be performed at a task location is to be performed at a later point in time, the method further comprising tracking the location of said mobile communication devices using the received location information; for each mobile communication device, determining a set of routes commonly used by its trusted owner from the tracked locations; wherein the step of deriving said location comprises selecting a likely route from said set of routes; and extrapolating a future location of the trusted owner at the later point in time from the selected route; wherein the step of calculating said cost score comprises calculating a distance between the task location and the extrapolated future location.

In this embodiment, the current locations of the various trusted owners are being (continuously or periodically) monitored in order to establish travelling patterns for these owners, for instance to establish which route a trusted user usually takes on a particular day of the week and at which time of day, e.g. a route to and from work. Such routes may be used to extrapolate an expected position for the trusted owner at the point in time at which the task requires performing, such that the cost for performing the task by that trusted owner can be more accurately estimated, as in this scenario the location of the trusted owner at the time the task is being issued can be of limited relevance.

The computer-implemented method may further comprise adapting the set of routes associated with a trusted owner based on additional location tracking information of the mobile communication device of said owner in order to improve the accuracy of the route prediction.

In an embodiment, the set of task locations includes a plurality of task locations, the method further comprising selecting the task location from the set based on the calculated cost scores. This further improves the intelligence of the task assignment process as it is not presumed that a physical location of the task that is nearest to the physical location from which the task is requested is the most convenient physical location for performing the task.

For instance, the step of assigning the task to a selected task location to one of said mobile communication devices based on the calculated cost scores may comprise assigning the task to a combination of the task location from said set and the mobile communication device having the lowest overall cost score. In this embodiment, the task location is selected based on which trusted owner can deliver the task with minimum cost to ensure that the task is completed as efficiently as possible, which is also in the interest of the requester of the task, e.g. an elderly person awaiting delivery of a requested article.

In case the task includes the delivery of one or more items (service or products) to a destination such as the home of the requester of the task, the step of calculating the cost score may further include calculating the cost score indicating the cost of the trusted owner of said mobile communication device to reach said destination from the task location in said set. This further improves the accuracy and intelligence of the task assignment process.

In an embodiment, the computer-implemented method further comprises assigning a preference score to each trusted owner, wherein the step of assigning the task to one of said mobile communication devices is based on a combination of the preference score and the calculated cost score. This ensures that a trade-off is made between task completion by a preferred individual and most efficient task completion. This is important for instance in scenarios where the task has to be completed with a certain urgency, e.g. collection of medication, and where the requester of the task will accept execution of the task by a less preferred individual if this individual can perform the task at significantly lower cost or in the case of unavailability of the preferred individual.

The step of generating the task may comprise selecting the task from a pool of tasks, the method further comprising accessing a list of mobile communication devices each associated with a trusted owner, wherein each trusted owner is associated with a subset of said tasks; and dynamically creating the pool of mobile communication devices by selecting trusted owners comprising the generated task in said subset. This ensures that tasks are only assigned to individuals considered suitable to perform the task.

The computer-implemented method may further comprise dynamically creating the pool of mobile communication devices from a list of mobile communication devices each associated with a trusted owner based on availability information for said trusted owners. This ensures that tasks are only assigned to individuals that are available to perform the task.

The task may include the purchase of an article, wherein the set of task locations is compiled from a plurality of task locations based on at least one of availability information and price information of said article at said task locations. This for instance ensures that only task locations are selected that have the article in stock and/or can provide the article at a price that is acceptable to the requester of the task. Such availability and price information may for instance be retrieved from the Internet, e.g. by automatically accessing websites of the sellers of such articles or price comparison websites.

In accordance with another aspect, there is provided a computer program product comprising a computer-readable storage medium including computer program code which when executed on one or more processors of a computer system implements the method according to one or more embodiments of the present invention. Non-limiting examples of such a computer-readable storage medium include a CD, DVD, flash memory card, a USB memory stick, a random access memory, a read-only memory, a computer hard disk, a storage area network, a network server, an Internet server and so on.

In accordance with yet another aspect, there is provided a system comprising the aforementioned computer program product and at least one processor adapted to execute said computer program code. Such a system benefits from the improved routing of tasks to trusted owners of mobile communication devices as explained in more detail above. Non-limiting examples of such a system include a desktop computer, a laptop computer, a tablet computer, a mobile communications device such as a smart phone or a network comprising two or more of such devices.

The system may further comprise a database architecture including a list of trusted owners of mobile communication devices, a list of events and a list of event response logs in order to assign tasks to the appropriate task location and trusted owner of the mobile communication device to which the task will be assigned.

The system may further comprise a user interface for accessing said database architecture to allow a system owner to amend the database architecture, e.g. to update the database architecture by adding or deleting trusted owners, events, event history and so on.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

It should be understood that the Figures are merely schematic and are not drawn to scale. It should also be understood that the same reference numerals are used throughout the Figures to indicate the same or similar parts.

The present invention relates to a system and method for assigning a task to a mobile communications device of someone who is shortlisted or otherwise selected as a potential candidate to perform the requested task. Whereas in the prior art task assignment to a selected person is achieved on the basis of a distance between the location of the selected person and the task location, as for instance disclosed in US 2011/045841 A1, the present invention is based on the insight that in certain scenarios basing the assignment decision on distance from a present location only can lead to an inaccurate or sub-optimal assignment process. This may be because it is not straightforward to arrive at the target location from a location considered nearest to the target location, or because at a desired time for the performance of the task the actual location of the potential candidate to execute the task may be different to the location of that person at the time of assigning the task, in which case a more complex (predictive) routing problem needs solving in order to ensure that the task is assigned to the most appropriate person.

To this end, embodiments of the present invention use the present location of a candidate to perform the task to calculate a cost value expressing the effort or degree of difficulty for that candidate to reach the task location from their present location.

In an embodiment, this cost value may be calculated by considering environmental factors such as road or traffic conditions, weather conditions, and so on to establish whether the candidate will face difficulty in reaching the task location. For instance, the cost value may be an expression of the amount of time it will take for the candidate to reach the task location, which for instance may be determined based on projected average speed over the route between the present location of the candidate and the task location and/or based on changes to the route that are required to avoid encountering adverse environmental factors such as traffic jams, road works, road closures due to adverse weather conditions or road works, and so on.

In another embodiment, this cost value may be calculated by extrapolating a future location of the candidate that is relevant for the desired (i.e. specified) task completion time from a location of the candidate at the time of issuing the task assignment request, for instance by establishing travelling patterns for that candidate, selecting the appropriate expected travelling pattern for that candidate based on actual location or day of the week for instance and calculating the extra distance the candidate would have to cover in order to complete the task. This therefore ensures that the task is assigned to the person that has to deviate the smallest amount from his/her intended route in order to complete the task. This may be combined with calculating the expected difficulty of that person to reach the task location from the extrapolated future location, which for instance can be achieved if the one or more routes between the extrapolated future location and the task location exhibit predictable traffic conditions, for instance traffic jams occurring at set times during the week, scheduled road works for which information has been collected expressing the delay to travelling over that road and so on. In an embodiment, the cost value may be expressed as the additional amount of time it will take for the candidate to complete the task when deviating from their intended route in order to complete the task.

Figure 1:
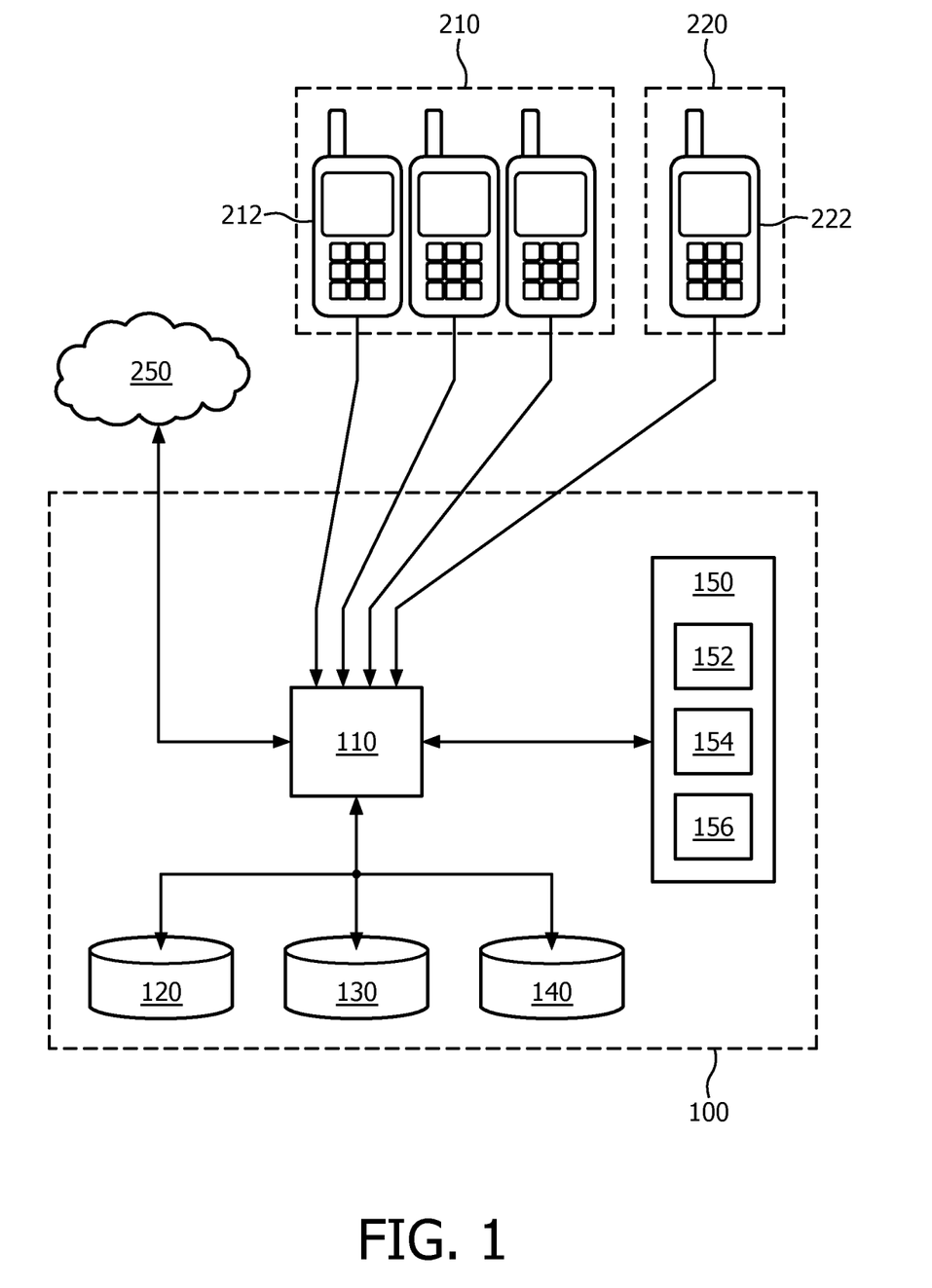
FIG. 1 schematically depicts a task assignment architecture in accordance with an embodiment of the present invention.

FIG. 1 schematically depicts an architecture for implementing a task assignment method according to an embodiment of the present invention. At the heart of this architecture is a system 100, which typically is controlled by the person requesting the execution of the task, for instance an elderly person. The system 100 comprises one or more processors 110 adapted to execute the various steps of the aforementioned method, as will be explained in more detail later. In an embodiment, the one or more processors 110 may be connected to the Internet 250 in any suitable manner, e.g. via a wired or wireless Internet connection. The system 100 further comprises a database architecture including database components 120, 130 and 140, which may be discrete databases or may be subsections of a single database. In an embodiment, the system 100 may further comprise a user interface 150 as will be explained in more detail later.

System 100 may be implemented on any suitable device or cluster of devices, e.g. one or more of a personal computer, which may be a desktop or laptop computer, a tablet computer, a mobile communication device such as a mobile phone, e.g. a smart phone, or a personal digital assistant and so on. In case of such a distributed system 100, the various components of the distributed system 100 may be adapted to communicate with each other in any suitable manner, e.g. over a wired or wireless network using any suitable communication protocol.

The architecture further comprises one or more groups of mobile communication devices recognized as belonging to persons considered suitable to perform or execute the task to be assigned. Such persons will be referred to as trusted owners of such mobile communication devices and may for instance be friends or relatives of the person assigning the task, or may be medical professionals such as a medical consultant, general practitioner, carer and so on. Each group may be considered to refer to persons suitable to perform a particular type of task, with different groups referring to different types of tasks. For instance, the persons in one group may be considered suitable to perform shopping tasks or to run general errands whereas the persons in another group may be considered suitable to attend to tasks of a medical nature, e.g. medical emergencies.

In FIG. 1, a first group 210 comprising a plurality of mobile communication devices 212 and a second group 220 comprising a single mobile communication device 222 are shown by way of non-limiting example only. It should be understood that the architecture may comprise any suitable number of groups comprising any suitable number of mobile communication devices such as mobile (smart) phones, personal digital assistants, tablets and so on.

In an embodiment, the one or more processors 110 may be adapted to interact with the various other components of the system 100, and may further be adapted to train and execute models and algorithms belonging to the task assignment method, e.g. a computer program implementing this method. The computer program communicates with the apps on the mobile communication devices of the trusted owners who have signed up to perform tasks for the issuer of the task such as a specific elderly person.

In an embodiment, each mobile communication device 212, 222 continuously or periodically provide information about the present location of the mobile communication device. To this end, the mobile communication device 212, 222 may for instance comprise an app that generates such location information and forwards this information to the system 100 in any suitable manner, e.g. using mobile telephony signals or the Internet. The location information may be associated with the location of the trusted owner of the mobile communication device 212, 222. This essentially assumes that the mobile communication device 212, 222 is in the possession of its trusted owner. The location information may be obtained in any suitable manner, for instance using GPS data which can be used to determine the location of the mobile communication device 212, 222 with high accuracy or using cell information of the mobile telephony network that the mobile communication device 212, 222 forms part of. This yields a more approximate location for the mobile communication device 212, 222.

In an embodiment, the one or more processors 110 may be adapted to retrieve resource information such as the locations and open hours of various facilities and shops and the availability and prices of goods in those shops from the Internet 250, for instance by collecting data from relevant websites through simple web services. Such resource information may for instance be used when multiple candidate task locations are available in order to determine which task location should be selected.

Such selection may for instance be simply based on the availability of a desired article and/or the cost of the desired article or alternatively such a selection may require more complex decision-making algorithms in which the availability and/or cost of the desired article are combined with the respective cost values of the candidate trusted owners for executing the task. For instance, a task location may be selected for which the product of the cost of the article and the cost value for the candidate has a minimum value. It will be apparent to the skilled person that such a task location selection algorithm may take many suitable forms and indeed may be configured by individual users in order to meet with their approval or needs.

At this point, the purpose of the database components 120, 130 and 140 will be explained in more detail. The first database component 120 is an event repository, which consists of all the possible types of events that can be handled by the system 100. The event repository, for example, can include tasks such as responding to a medical event such as a fall or some sickness, responding to a social condition such as feeling depressed or feeling lonely, purchasing a grocery item, collecting a prescribed medicament, arranging a household repair and so on.

In an embodiment, the event repository 120 may be configurable such that if a specific event cannot be found in the event repository, the system 100 may provide the user with the option of adding the desired event or task to the event repository 120, for instance through the user interface 150. The user may configure the event repository 120 in any suitable manner, for instance by providing a description of an event or task to be added to the event repository and the system 100 matching the specified event or task to the closest event or task in a predefined list. The user may specify the event or task in any suitable manner, e.g. using a keyboard, mouse, voice recognition software and so on.

The second database component 130 may comprise a preference repository containing the preferences of the user and/or the preferences of the various trusted owners of the mobile communication devices 212 and 222 in the various groups 210 and 220. In an embodiment, the user of the system 100 may specify a preference score for each trusted owner in order to establish which trusted owner to contact first or not to contact at all for certain tasks. The preferences of the trusted owners could include, for example, not to be disturbed for certain non-emergency tasks, or only to be disturbed during certain times of the day, and so on. The preferences of the user and the trusted owner may for instance be taken into account when assigning the task to a particular trusted owner. In an embodiment, a task may be assigned to a trusted owner based on his/her preference score and the calculated cost value in order to find the optimal trade-off between user preference and inconvenience to the trusted owners.

The third database component 140 may be a historical database that contains information about the past events or tasks issued by the user of the system 100. This may include information about past events type, past locational data, information displayed to the user in the past, recommendations generated and displayed in the past, and the actual actions taken by the user in the past. In some embodiments, users may be categorized by the system 100 into various categories using simple socioeconomic and physical characteristics such as age, gender, educational and professional background, body type, physical health, emotional health, family details, and so on.

In an embodiment, the historical database may further include information about the historical events of suitable other users, e.g. users belonging to the same category. This further information may be collected in any suitable manner, for instance by communication with other instances of the system 100 over the Internet. Such data from other users can be especially helpful when a new user starts using the system 100, for instance to calibrate initial learning models. In an embodiment, after an issued task is considered completed, relevant data relating to the task completion process may be entered into the historical database, such that the system 100 can rely on this relevant data the next time the same or a similar task is to be issued.

At this point, a non-limiting example of a user interface 150 will be provided. It should be understood however that the user interface 150 may take any suitable shape or form. The user interface 150 may be implemented on the same device comprising the one or more processors 110 or may be implemented on a separate device such as a laptop computer, tablet computer or mobile communications device such as a mobile phone that can communicate user instructions with the one or more processors 110.

As shown in FIG. 1, the user interface may consist of 3 different parts. A real-time interface 152 may be used by the users of the system 100 to report events or tasks, to browse information provided by the system 100, to explore the suggested/recommended task assignments, and to select a specific trusted owner to which the task is to be assigned. For instance, the user of the system 100 may be presented with a list of trusted owners for which a suitable cost value has been calculated, e.g. a cost value below a defined threshold, such that the user can select a preferred trusted owner from this list.

Alternatively, a task may be automatically assigned to a trusted owner by the system 100, in which case the user is simply informed of the assignment decision and the trusted owner to which the task has been assigned. This is for instance useful in case of an emergency situation where the user may not be interested in selecting a particular trusted owner but simply wants to ensure that a suitable trusted owner as specified in the system 100, e.g. in the event repository 120, is selected that can respond to the emergency as soon as possible.

The user interface 150 may further comprise a preference entry interface 154, which is to be periodically used by the user to enter and update the user's preferences. The preference entry interface 154 may for instance be configured to communicate with the preference repository 130.

The user interface 150 may further comprise a post decision interface 156, which is to be used to enter information on what was the actual path of response taken after the task was assigned and completed. The post decision interface 156 may for instance be configured to communicate with the historical database 140 in order to store this information in the historical database 140.

A task may be assigned to a trusted owner in any suitable manner. For instance, the trusted owner may be made aware of the task assignment using any suitable communication channel such as a (automated) phone call, a text message, by e-mail, by tweet and so on.

An embodiment of a method of assigning tasks using the system 100 will now be explained in more detail with the aid of FIG. 2. In the remainder, it will be assumed that a task selected by the user of the system 100 to be assigned to one of the trusted owners will be assigned to a trusted owner belonging to the first group 210. It should be understood that this is by way of non-limiting example only.

The method 1 starts by progressing to step 10 in which a task to be performed at a selected location is generated. For instance, the user of the system 100 may select the task from a list of tasks stored in the event repository 120 or may specify a task or event requiring a response by a trusted owner, which specified task or event is matched by the one or more processors 110 to a single task or event or a selection of tasks or events in the event repository 120, after which the user may confirm the appropriate task or event. This step may further comprise identifying the appropriate group of trusted owners to assign the task to. This may for instance be achieved by retrieving this group from the appropriate database component, e.g. the preference repository 130. As mentioned before, it will be assumed by way of non-limiting example that the appropriate group is group 210.

The method then proceeds to step 20, in which location information is collected for the various trusted owners that are considered suitable to perform the task selected in step 10, i.e. the trusted owners within the group 210, by means of their mobile communication devices 212. Alternatively, step 20 may be performed at any suitable time, that is, step 20 is not necessarily performed after completion of step 10, as will be explained in more detail later. Where relevant, step 20 may further comprise retrieving relevant information such task location, e.g. the location(s) where certain articles may be purchased, the availability and/or price of such articles at these locations, environmental information such as traffic and/or weather conditions in the vicinity of these locations, and so on. Such information may be retrieved in any suitable manner, for instance from the Internet 250, from at least one of mobile telephony signals, radio traffic information signals, traffic information embedded in GPS signals and so on. The system 100 may be configured to directly receive such signals or to have such signals relayed to the system 100, e.g. via the Internet 250. For instance, the system 100 may be subscribed to an Internet-based service providing such information.

In step 30, the location information obtained from the mobile communication devices 212 of the trusted owners belonging to group 210 may be used to determine the respective present locations of the trusted owners. In an embodiment the location information is obtained at a single point in time such that the location information is translated into the location at that point in time, e.g. the present location.

In an alternative embodiment, the system 100 tracks the location information for the various trusted owners over a period of time to establish travel patterns for these owners, such that the present location of a trusted owner may be assumed by evaluating the established travel patterns and selecting the appropriate travel pattern for that point in time. For instance, during weekdays, a trusted owner may follow the same route to and from work at approximately the same time of day, whereas at weekends, the trusted owner may exhibit predictable travel behavior for instance from and to a sports club.

This information can be used to assume the present location of such a trusted owner as a function of day of the week and time of day such that it is not necessary in this embodiment to perform step 20 upon completion of step 10. Instead, as previously explained, step 20 is typically performed continuously or periodically in order to establish the travelling behavioral patterns of the trusted users. This for instance reduces the risk that the present location of a trusted owner of one of the mobile communication devices 212 cannot be determined following the generation of the task to be performed at a given location in step 10, for instance in situations where the mobile communication device 212 has lost connectivity with its network.

In an embodiment, the system 100 may further determine the availability of the trusted owners in group 210. This for instance may be achieved by utilizing latest availability and preference information as provided by the trusted owners for instance through their calendars or any other interfaces on their mobile communication device or any other electronic device that can be accessed by the system 100, such as a tablet computer, desktop computer, laptop computer or the like. This availability information may be used to remove unavailable trusted owners from the group 210 to ensure that the task is assigned to an available trusted owner only. The availability information may be obtained at any suitable point in time, for instance prior to or subsequent to determining the present locations of the trusted owners as previously explained.

Method 1 may subsequently proceed to step 40 in which a cost score is calculated for each (available) trusted owner in group 210. As previously explained, the cost score expresses the amount of effort (e.g. amount of time) it takes a trusted owner to complete the task to be assigned. This may simply be a cost score based on the amount of effort required to reach the task location from a starting location, which may be the present location or a future location extrapolated from the present location as will be explained in more detail later.

Alternatively, the cost score may further include the effort it requires to deliver the task from the task location to the home of the user of the system 100. This for instance may be relevant if more than one task location is to be considered; a task location nearby the home of the user may be less suitable than a task location nearby the relevant location of a trusted owner of a mobile communication device 212, which can be captured in the cost score by considering the delivery effort.

A non-limiting example embodiment of a suitable algorithm for calculating such a cost score is given below. It should be immediately understood that many suitable algorithms can be readily provided by the skilled person and that such alternative algorithms are also considered to fall within the scope of the present invention.

The algorithm may be constructed as follows. Let $L_0$ represent the location of the home of the user of the system 100, e.g. an elderly person requiring assistance. Let $(L_1^P(t), L_2^P(t), \ldots, L_N^P(t))$ denote the locations of the N trusted owners at time t. Let $(L_1^S, L_2^S, \ldots, L_M^S)$ denote the task locations, e.g. locations of facilities or shops where a certain product or service is available, e.g. a supermarket, grocery, pharmacy, a plumber, and so on. Let TT (A, B, t) denote the cost score, e.g. travel time from location A to location B, when starting the trip at time t. This function is continuously calculated and updated using traffic and other real-time data feeds being received from the Internet and/or other suitable information sources as previously explained.

The earliest time when the user of the system 100, e.g. an elderly person, can access a product or service that is available at $j^{th}$ facility with the help from trusted owner i who becomes available at time t, is given by:

$$t+TT(L_i^P(t),L_j^S,t)+TT(L_j^S,L_0,TT(L_i^P(t),L_j^S,t)+t).$$

If the product or service is available at multiple locations, namely, $(L_1^S, L_2^S, \ldots, L_M^S)$, then the earliest point in time when the user of system 100 can access the product or service with the help from trusted owner i who becomes available at time t is:

$$\min_{j\in\{1,\ldots,M\}}(t+TT(L_i^P(t),L_j^S,t)+TT(L_j^S,L_0,TT(L_i^P(t),L_j^S,t)+t)).$$

If the trusted owner i is only available to start their journey during time period $[t_{j1}, t_{j2}]$, for instance after work, then this equation gets modified to:

$$\min_{j\in\{1,\ldots,M\},t\in[t_{j1},t_{j2}]}(t+TT(L_i^P(t),L_j^S,t)+TT(L_j^S,L_0,TT(L_i^P(t),L_j^S,t)+t)).$$

Furthermore, if multiple trusted owners located at $(L_1^P(t), L_2^P(t), \ldots, L_N^P(t))$ are available to help the user of the system 100, e.g. the elderly person, then the earliest the product or service can reach the elderly is given by:

$$\min_{i\in\{1,\ldots,N\},j\in\{1,\ldots,M\},t\in[t_{j1},t_{j2}]}(t+TT(L_i^P(t),L_j^S,t)+TT(L_j^S,L_0,TT(L_i^P(t),L_j^S,t)+t))$$

In the above example, a task is typically assigned to a selected trusted owner based on the optimum convenience to the user of the system 100, i.e. the algorithm is based on getting the service or product to the user as soon as possible. It should be understood that this is by way of non-limiting example only. It is for instance equally feasible to derive an algorithm in which the service or product is provided to the user of the system 100 as a function of minimal disruption to the daily routine of the trusted owners of the mobile communication devices 212. In yet another embodiment, the algorithm may be provided that proposes to assign or assigns the task to a subset of trusted owners or to a particular trusted owner based on a cost score that is based on both minimum waiting time for the user and minimum disruption to the daily routine of the particular user in order to find an optimal compromise between these two potentially conflicting interests. The disruption to the daily routine of the suitable trusted owners may for instance be taken into consideration if the task to be assigned is a non-urgent task, e.g. a task related to an event that is not classed as an emergency.

Optional step 50 may also be considered when calculating the cost score in step 40. In this step, a preference score is obtained for each (available) trusted owner of the mobile communication devices 212 in group 210. This score may for instance be retrieved from preference repository 130. This for instance may be advantageous in a situation where a user such as an elderly person feels more comfortable asking a close relative such as a child, brother or sister to help rather than to ask a distant relative such as a cousin or nephew.

The aforementioned example algorithm may be amended in any suitable way to take such preferences into account. A non-limiting example of a suitable modification to the aforementioned algorithm is as follows. Let $a_i$ denote an implicit multiplier to trusted owner i's time. The implicit multiplier corresponds to the preference rating of that trusted owner; for instance the value of this multiplier may be high for those trusted owners whose time is deemed more valuable by the user for any reason. Moreover, the user may be reluctant to ask anyone for help. This may be expressed as an additional (constant) cost multiplier, irrespective of the time the completion of the task consumes. Let the additional cost for trusted owner i be $b_i$. Consequently, the generalized cost of asking a trusted owner to perform the requested task is given as a function of their travel time, rather than as a minimization of the task completion time:

$$\min_{i\in\{1,\ldots,N\},j\in\{1,\ldots,M\},t\in[t_{j1},t_{j2}]}(a_i(TT(L_i^P(t),L_j^S,t)+TT(L_j^S,L_0,TT(L_i^P(t),L_j^S,t)+t))+b_i).$$

Using such an algorithm, the method 1 proceeds to step 60 in which the desired task is assigned to a selected trusted owner of one of the mobile communication devices 212. As previously explained, the assignment may be made by the user of the system 100 based on a selection of suitable candidate trusted owners generated by the system 100 or alternatively may be automatically made by the system 100 in a deterministic manner, e.g. by assigning the task to the trusted owner having the lowest cost score. The selected trusted owner may be informed of the task assignment in any suitable manner as previously explained, for instance by means of a text message, an automated phone call, an e-mail, a tweet and so on.

In an embodiment, the trusted owner may be required to confirm acceptance of the task within a defined period of time. In the absence of such confirmation within that time period, the system 100 may reassign the task to another trusted owner. This may be accompanied by a message in any suitable form to the originally intended owner of the task informing this trusted owner that the task has been reassigned in order to avoid the same task being performed twice.

In an embodiment, the system 100 may check if the selected event or task is classed as an emergency, for instance by querying the user or by checking if the event or task is labeled as an emergency in the event repository 120. In case of such an emergency, the method 1 may further comprise the step of contacting a pre-designated primary contact person, physician or emergency call center (e.g. 911 in the USA or 999 in the UK) using any suitable way of contacting such a person or organization as previously explained. This may for instance be a trusted owner in group 220. This step may be performed in combination with alerting a trusted owner from group 210, in which case the assigned task is to visit the user of the system 100, e.g. as a matter of urgency.

Figure 2:
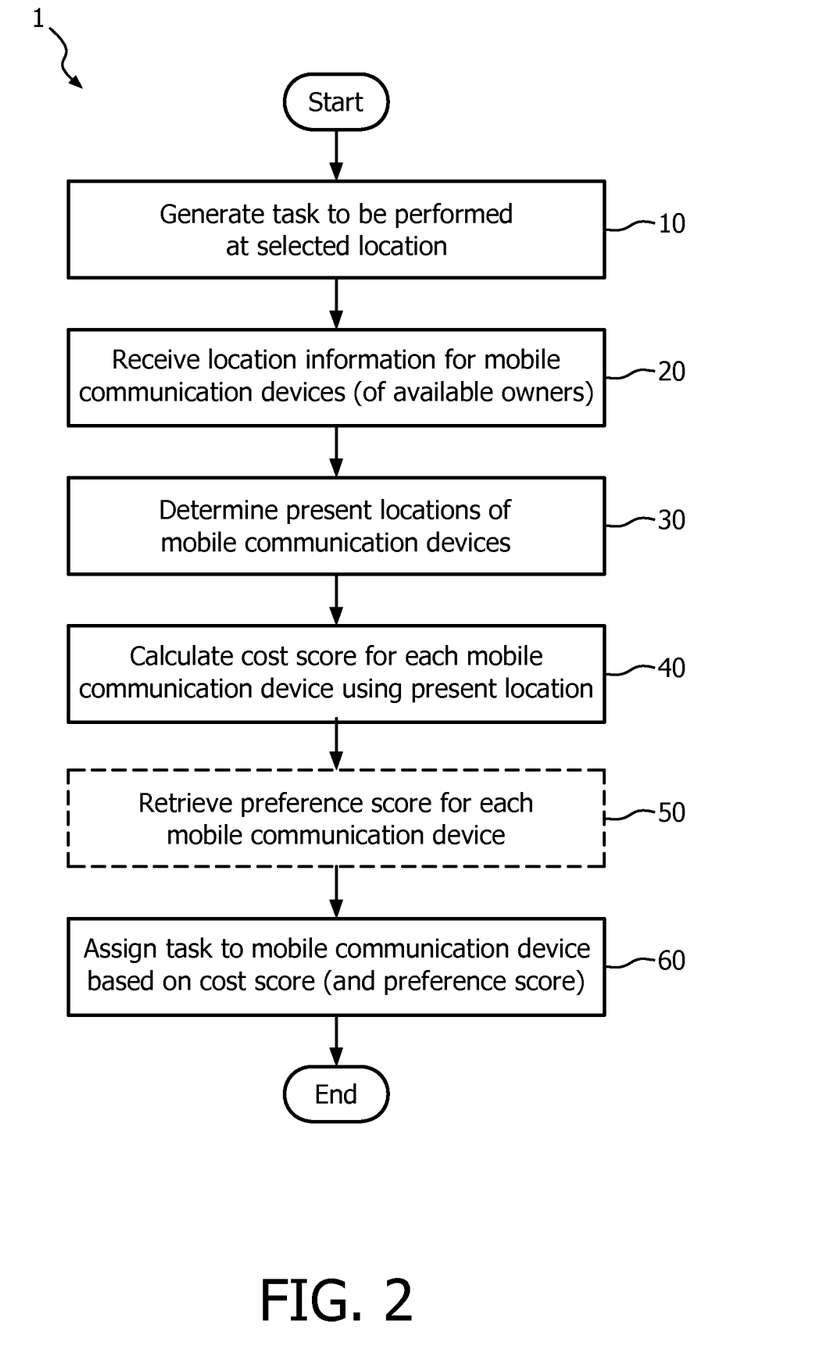
FIG. 2 schematically depicts a task assignment method in accordance with an embodiment of the present invention.
Figure 3:
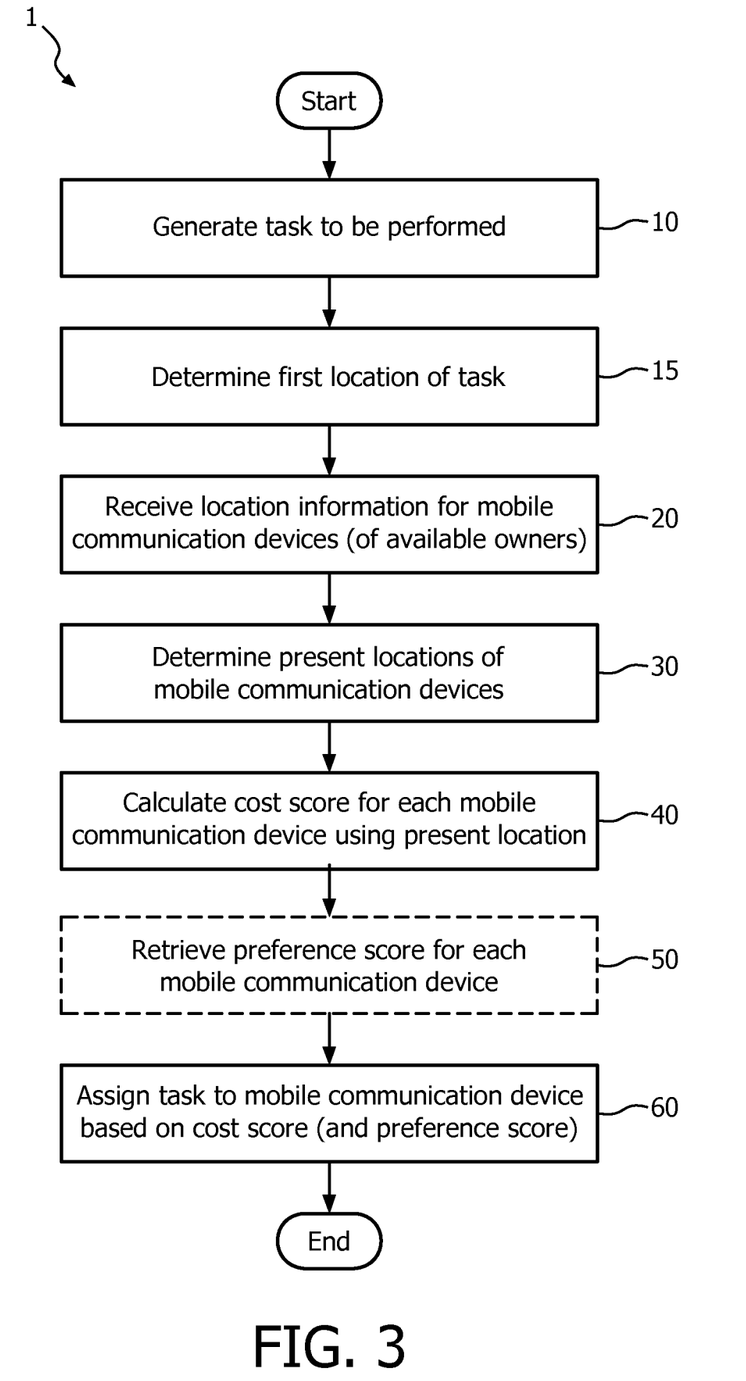
FIG. 3 schematically depicts a task assignment method in accordance with another embodiment of the present invention.

The flowchart of the method 1 shown in FIG. 2 assumes a single location where the task is to be performed. FIG. 3 depicts a flowchart of the method 1 according to an alternative embodiment of the present invention in which multiple candidate task locations may exist. This flowchart is identical to the one shown in FIG. 2, with the difference that an additional step 15 is present in which the most appropriate task location is selected. As previously explained, the selection of this appropriate task location may be based on the availability and/or price of the service or product to be acquired at that location, the time required to deliver the service or product from that location to the user of system 100, e.g. the elderly person, the amount of disruption to a daily routine of the candidate trusted owners to perform the task, or a combination thereof.

At this point, it is noted that parameters such as $a_i$ and $b_i$ in the aforementioned algorithm may not be readily available. In an embodiment, the system 100 is adapted to learn to assign appropriate values to these parameters based on the past task assignment decisions of the owner of the system 100 and similar owners of other instances of the system 100 as mentioned above. This may for instance be achieved by maintaining, calibrating and periodically updating task response models, e.g. updating such models after every response to an event generating a task. Such response typically comprises the completion of the task, e.g. the delivery of a service or product to user of the system 100. Once the event and the response has been completed, the user of the system 100 may record the final action taken, e.g. the selection of task location and/or trusted owner, the delay between task generation and task completion and so on. This may for instance be captured as follows.

Let the final action be denoted by a binary variable $y_k$ which equals 1 if the $k^{th}$ response scenario was followed. It may be assumed that this particular scenario was chosen by the user because its cost score was lower than the cost score of any of the other action plans. This information or data point can be used to update the values of parameters such as $a_i$ and $b_i$. This data point will be added to the already existing (i.e. previously collected) data points and the models will be re-estimated or recalibrated accordingly. It is noted that appropriate machine learning algorithms and statistical methods to perform such recalibration are well known per se and it suffices to say that any suitable algorithm and method may be used for this purpose.

A non-limiting example of such a learning method is to estimate a multinomial logit model where the appropriateness or utility of action k is given by an exponential function of its cost. For example, in the case above, if the $k^{th}$ scenario involves asking person i to help, then the utility of this scenario may be given by:

$$u_i = a_i(TT(L_i^P(t), L_j^S, t) + TT(L_j^S, L_0, TT(L_i^P(t), L_j^S, t) + t)) + b_i.$$

Multinomial logit models can be estimated using any standard statistical package. In an embodiment, the past event or task response results from the user of the system 100 are given a higher weight than the corresponding event or task response results from similar owners of other instances of the system 100. The updated values of parameters such as $a_i$ and $b_i$ are then used for all subsequent cost calculations.

Figure 4:
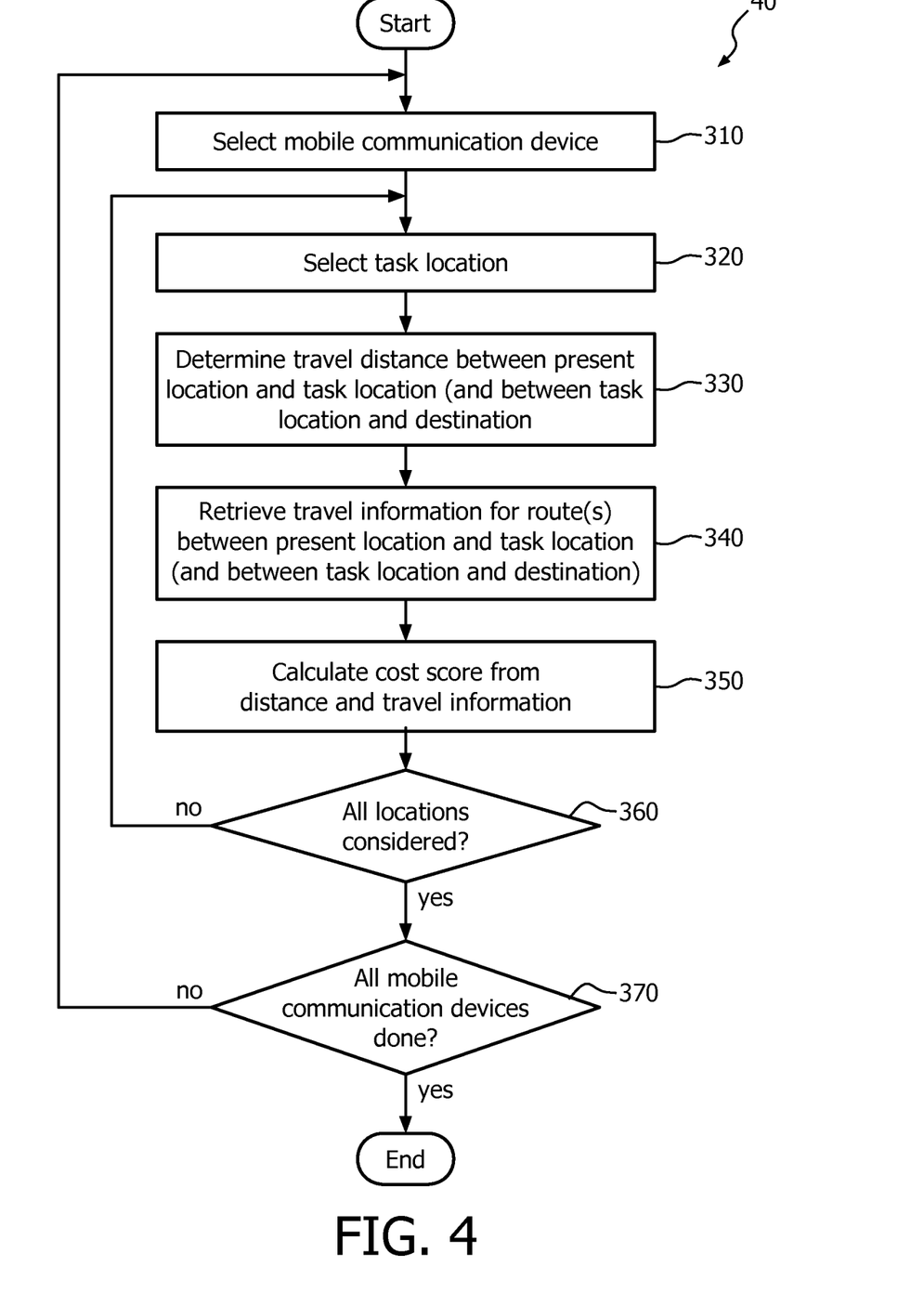
FIG. 4 schematically depicts an aspect of a task assignment method in accordance with an embodiment of the present invention.

An example aspect of an embodiment of a cost score calculation method (i.e. step 40 in FIGS. 2 and 3) is explained in more detail with the aid of the flowchart shown in FIG. 4. The method starts by proceeding to step 310 in which one of the mobile communication devices 212 from the group 210 is selected. The method then proceeds to step 320 in which a task location is selected. In step 330, a travel distance or route between the present location (as determined in step 30) of the mobile communication device 212 and the task location is determined. This may for instance be achieved using routine route planning algorithms, as for instance is known per se in the field of satellite navigation or other route planning fields. In step 340, environmental information such as traffic conditions, e.g. congestion or road works, and/or weather conditions are obtained using the Internet 250 or any other suitable source of such information as previously explained, after which a cost score is calculated in step 350 from the distance or route as obtained in step 330 and the environmental information as obtained in step 340.

In an embodiment, the distance or route and environmental conditions from the task location to the home of the user of the system 100 may also be included in this calculation, and as previously mentioned, other factors such as the preference score assigned by the user to that particular trusted owner may also be included in this calculation, as has been explained in more detail above.

In step 360, it is checked if a cost score for the trusted owner of the mobile communication device 212 has been calculated for all potential task locations. If more task locations require the calculation of the cost score, the method will return to step 320 to select the next task location and calculate the cost score for that task location as explained above. If on the other hand all task locations have been considered for that particular trusted owner, the method proceeds to step 370 in which it is checked if cost scores have been calculated for all trusted owners of the mobile communication devices 212 in the group 210. If not all trusted owners have been considered, the method returns to step 310 in which the next mobile communications device 212 is selected and the respective cost scores in relation to the one or more task locations are calculated for the next mobile communications device 212. This is repeated until all cost scores are calculated for all mobile communications devices 212, after which step 40 will terminate.

It is noted that it is of course equally feasible to change the order of some of the steps in FIG. 4 without departing from the teachings of the present invention. For instance, steps 310 and 320 as well as steps 360 and 370 may be interchanged to arrive at an equally suitable embodiment.

The embodiment shown in FIG. 4 is particularly useful if the task to be assigned needs to be performed instantaneously or at least without undue delay, in which case the actual location of the trusted owners of the respective mobile communication devices 212 is relevant. This may for instance be an embodiment in which the cost score is calculated based on the desire to minimize the inconvenience to the user of the system 100, e.g. to ensure that the desired product or service is delivered to the user with minimal delay as previously explained.

However, the user of the system 100, e.g. the elderly person, may specify that a certain event or task does not require urgent attention, for instance because the user does not have an urgent need for a particular service or product.

Figure 5:
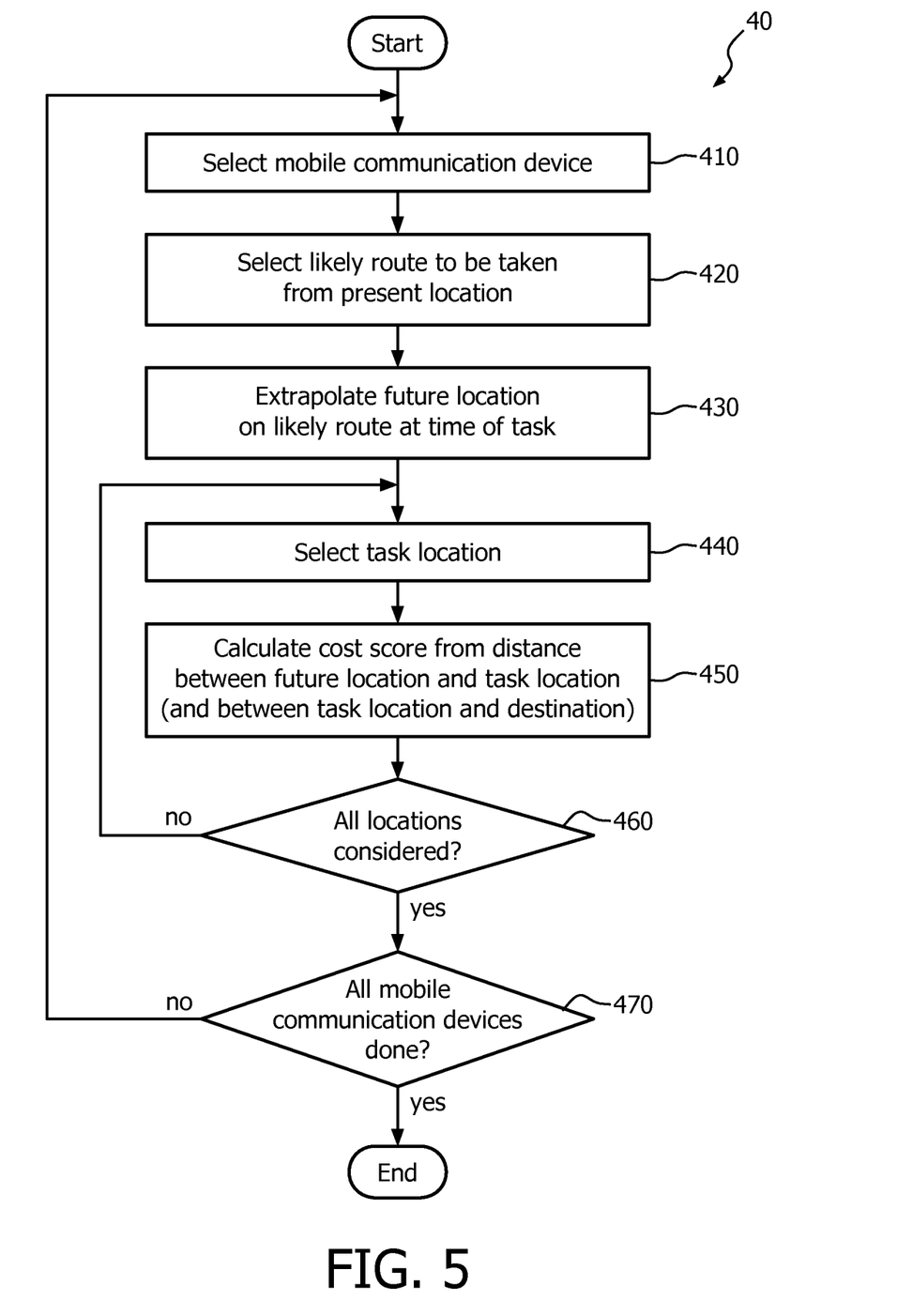
FIG. 5 schematically depicts an aspect of a task assignment method in accordance with another embodiment of the present invention.

In this case, the user may specify that a certain task needs completing at or by a certain time in the future, e.g. later that day. In this embodiment, the present location of a trusted owner of a mobile communications device 212 may be of limited relevance for the purpose of calculation of the cost score, as the location of the trusted owner may change, for instance because the trusted owner has left work and has commenced the journey home. In this case, it will be necessary to somehow predict the relevant location of the trusted owner near the time the user has requested that the task is performed in order to obtain a meaningful cost score for that user. FIG. 5 shows a flowchart of an example embodiment of step 40 in which this problem is addressed.

The method starts by proceeding to step 410 in which a mobile communication device 212 is selected from the group 210 as previously explained. The method then proceeds to step 420 in which a likely route to be taken from the present location of the trusted owner of the device around the time at which the task needs to be performed is selected, e.g. extrapolated. One possible way of selecting his route is by allowing the trusted owner to make travel plans for the rest of the day available to the system 100. This for instance can be achieved by specifying a destination address for an appointment in their calendar. For instance, the trusted owner may indicate that they have a dentist appointment, music lesson, garage visit and so on scheduled from 6 to 7 pm in a specific location such as a nearby town. The system 100 may use this information to calculate the future location of the trusted owner of the mobile communications device 212 at any later point in the day in step 430. This may for instance be achieved using well-known route planning algorithms as previously mentioned. Next, a candidate task location may be selected in step 440 and a cost score may be calculated from the distance between the future location extrapolated in step 430 and the task location selected in step 440. As before, the cost score calculation may also include a cost score component for the distance between the task location and the home of the user of the system 100, e.g. an elderly person.

In this embodiment, because the cost score is calculated for a task to be performed in the future, it may not always be possible to obtain environmental information for the various routes under consideration. In this case, the cost score may simply be based on distance travelled or on total time it will cost a trusted owner to complete the task assuming normal traffic conditions. On the other hand, such environmental conditions may be predictable, for instance because certain routes always suffer from congestion at certain times of the day or because road closures or road works have been announced affecting such routes, in which case of course a more complex or intelligent cost score may be obtained as previously explained.

This process may be repeated for all potential task locations as checked in step 460 and for all mobile communication devices 212 in group 210 as checked in step 470 and as explained in more detail with the aid of FIG. 4 (corresponding steps 360 and 370). Once all mobile communication devices 212 and potential task locations have been considered in the calculation of the respective cost scores, the cost score method may terminate, after which method 1 may proceed to step 50 or 60 as previously explained.

It is of course not always possible to predict a future location of one or more of the trusted owners of the mobile communication devices 212 from information volunteered by them, e.g. in diaries that are accessible by the system 100. Therefore, in an embodiment the system 100 may be adapted to recognize typical patterns in the daily schedules of the respective trusted owners. This may for instance be achieved by tracking the location of the trusted owner over a certain period of time, e.g. several days, weeks or even months, to allow the system 100 to recognize movement patterns of the trusted owner, such as time when the trusted typically departs home, reaches office, the days of week when the trusted owner goes out to a particular restaurant for lunch/dinner and so on.

Using this information, the system 100 can select an appropriate movement pattern, from which a present location at the time of issue of the task as well as a future location near the time the task requires performing can be extrapolated. It is important to recognize that this does not require the system 100 to acquire location information at the time the task to be performed is generated in step 10 of method 1, as the system 100 can instead use the established migration patterns of the trusted owners to select the appropriate migration pattern for that particular day and retrieve the required location information by extrapolation from the appropriate migration pattern. In other words, the system 100 in this embodiment estimates the likely future locations of the respective trusted owners at a relevant later point in time and uses the estimated future location rather than a (present) position determined in real-time to calculate the relevant cost scores, e.g. travel times, for the relevant point in time in the future.

In an embodiment, the system 100 can adapt the set of routes associated with a trusted owner based on additional location tracking information of the mobile communication device 212 of the trusted owner. For instance, the system 100 may continue to gather such location tracking information after establishing a set of routes in order to improve the accuracy of the routes and/or to add new routes or delete no longer used routes from the set.

In an embodiment, the system 100 may verify the actual location of the trusted owner by means of actual location information and use the determined actual location to select the appropriate likely route the trusted owner will take that day. For instance, by determining that the actual location of the trusted owner is his or her workplace, the previously determined route from work to home may be selected as the likely route the trusted owner will take when leaving work, and the future location may be extrapolated from that likely route.

Although the above description has discussed assigning tasks to a mobile device associated with a trusted owner; it is observed that preferably the mobile communication devices associated with the trusted owner are also carried by the trusted owner. As a result it is possible to infer, throughout the assignment of tasks, that the location of the mobile communication device substantially corresponds with that of the associated trusted owner.

In preferred embodiments the association between mobile communication devices and trusted owner is one wherein each mobile communication device can be uniquely identified and each mobile communication device is associated to a singular trusted owner. In the event mobile communication devices can be associated to trusted owners dynamically, such association should be registered separately. If the association is static, the mobile communication device and trusted owner can be considered to represent a singular entity. An example of a dynamic association is described below.

In a medical emergency scenario dynamic association may be modelled as follows. The mobile communication device may be a mobile phone or a pager that can be uniquely identified. At the start of the shift an employee in question may take a mobile communication device from a set of mobile communication devices and may manually or automatically associate it to his name. As a result the association between the mobile communication device and the employee thus is unique and can be used during task assignment.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A computer-implemented method for assigning a task to a mobile communication device belonging to a pool of mobile communication devices, wherein each mobile communications device is associated with a trusted owner and is locatable by means of mobile telephony signals, the method comprising:
   generating a task to be performed for a user;
   generating a set of task locations at which the task can be performed;
   receiving, at a mobile receiver incorporated into the mobile communications device, the mobile telephony signals for the mobile communications devices;
   deriving a location for individual mobile communication devices from the mobile telephony signals;
   determining a cost score for individual mobile communication devices using the derived location of the individual mobile communication devices and individual task locations in the set of task locations, wherein the cost score is expressed in time;
   assigning a preference score to one or more trusted owners, the preference score indicating the user's one or more preferred trusted owners;
   modifying the determined cost score using the preference score;
   assigning the task to a communication device and a task location responsive to the communication device having a modified cost score below a pre-defined cost score threshold; and
   transmitting, by a mobile transmitter incorporated into the mobile communications device, the assigned task to the one of the mobile communication devices.

2. The computer-implemented method of claim 1, wherein the task includes the delivery of an item to a destination, and wherein the cost score further comprises travel information based upon the task location and the destination.

3. The computer-implemented method of claim 1, wherein the cost score comprises travel conditions between the location of the individual mobile communication device and the task location.

4. The computer-implemented method of claim 1, wherein the task to be performed at a task location is to be performed at a later point in time, the method further comprising:
   tracking the location of the mobile communication devices using the received mobile telephony signals; and
   for individual mobile communication devices, determining a set of routes commonly used by its trusted owner from the tracked locations;
   wherein the step of deriving the location comprises:
      selecting a likely route from the set of routes; and
      extrapolating a future location of the trusted owner at the later point in time from the selected route; and
      wherein the cost score comprises travel information based upon the task location and the extrapolated future location.

5. The computer-implemented method of claim 4, further comprising adapting the set of routes associated with a trusted owner based on additional location tracking information of the mobile communication device of the owner.

6. The computer-implemented method of claim 1,
   wherein the step of generating the task comprises selecting the task from a pool of tasks, the method further comprising:
   accessing a list of mobile communication devices each associated with a trusted owner, wherein each trusted owner is associated with a subset of the tasks; and
   dynamically creating the pool of mobile communication devices by selecting trusted owners associated with the generated task in the subset.

7. The computer-implemented method of claim 1, further comprising dynamically creating the pool of mobile communication devices from a list of mobile communication devices each associated with a trusted owner based on availability information for the trusted owners.

8. The computer-implemented method of claim 1, wherein the task includes the purchase of an article, and wherein the set of task locations is compiled from a plurality of task locations based on at least one of availability information and price information of the article at the task locations.

9. A mobile communication device belonging to a pool of mobile communication devices, wherein each mobile communications device is associated with a trusted owner and is locatable by means of mobile telephony signals, the mobile communication device comprising one or more processors configured by machine-readable instructions to:
   generate a task to be performed for a user;
   generate a set of task locations at which the task can be performed;
   receive, at a mobile receiver incorporated into the mobile communications device, the mobile telephony signals for the mobile communications devices;
   derive a location for individual mobile communication devices from the mobile telephony signals;
   determine a cost score for individual mobile communication devices using the derived location of the individual mobile communication devices and individual task locations in the set of task locations, wherein the cost score is expressed in time;
   assigning a preference score to each trusted owner, the preference score indicating the user's preferred trusted owners;
   modifying the determined cost score using the preference score;

assign the task to a communication device and a task location responsive to the communication device having a modified cost score below a pre-defined cost score threshold; and transmitting, by a mobile transmitter incorporated into the mobile communications device, the assigned task to the one of the mobile communication devices.

10. A mobile communication device belonging to a pool of mobile communication devices, wherein each mobile communications device is associated with a trusted owner and is locatable by means of mobile telephony signals, the mobile communication device comprising:

means for generating a task to be performed for a user;

means for generating a set of task locations at which the task can be performed;

means for receiving, at a mobile receiver incorporated into the mobile communications device, the mobile telephony signals for the mobile communications devices;

means for deriving a location for individual mobile communication devices from the mobile telephony signals;

means for determining a cost score for individual mobile communication devices using the derived location of the individual mobile communication devices and individual task locations in the set of task locations, wherein the cost score is expressed in time;

means for assigning a preference score to each trusted owner, the preference score indicating the user's preferred trusted owners;

means for modifying the determined cost score using the preference score; and     means for assigning the task to a communication device and a task location responsive to the communication device having a modified cost score below a pre-defined cost score threshold; and     means for transmitting, by a mobile transmitter incorporated into the mobile communications device, the assigned task to the one of the mobile communication devices.

11. The system of claim 9, further comprising a database architecture including a list of trusted owners of mobile communication devices, a list of events and a list of event response logs.

* * * * *